US012233526B2

(12) United States Patent
Elder et al.

(10) Patent No.: US 12,233,526 B2
(45) Date of Patent: Feb. 25, 2025

(54) POWER TOOL WITH ERGONOMIC HANDGRIP

(71) Applicant: BLACK & DECKER INC., New Britain, CT (US)

(72) Inventors: Christian Elder, Baltimore, MD (US); Daniel N. Lopano, Bel Air, MD (US); Gabriel Concari, Eldersburg, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 18/357,616

(22) Filed: Jul. 24, 2023

(65) Prior Publication Data

US 2023/0364770 A1 Nov. 16, 2023

Related U.S. Application Data

(63) Continuation of application No. 17/032,860, filed on Sep. 25, 2020, now Pat. No. 11,707,830, which is a (Continued)

(51) Int. Cl.
*B25F 5/02* (2006.01)
*B25F 5/00* (2006.01)

(52) U.S. Cl.
CPC ................ *B25F 5/02* (2013.01); *B25F 5/006* (2013.01)

(58) Field of Classification Search
CPC ... B25F 5/00; B25F 5/02; B25F 5/006; B25G 1/102

(Continued)

(56) References Cited

U.S. PATENT DOCUMENTS 2,320,067 A 5/1943 Caughren
2,456,571 A 12/1948 Turner et al.
(Continued)

FOREIGN PATENT DOCUMENTS

DE 10109956 B4 4/2009
DE 202013105823 U1 4/2014
(Continued)

OTHER PUBLICATIONS

Stuart Deutsch, "New Dewalt 20V Brushless Drywall Screwgun," Tool Guyd, Jul. 18, 2014, Retrieved from the Internet on Oct. 15, 2014 at URL: <http://toolguyd.com/dewalt-20v-brushless-drywall-screwgun/>.

(Continued)

*Primary Examiner* — Scott A Smith
(74) *Attorney, Agent, or Firm* — Scott B. Markow

(57) ABSTRACT

A power tool with an ergonomic handgrip includes a housing with a rear end portion, a first front end portion, a second front end portion, and lateral sidewalls. A working end proximate the first front end portion is configured to be driven by a motor. A handle has a proximal portion coupled to the housing, a distal end portion away from the housing, a rear wall portion, a front wall portion, and a pair of sidewalls, and defines a handle axis. A trigger is coupled to the handle and defines a trigger axis. A first gripping region includes a rear concave recess on the rear end portion and a lateral concave recess extending along at least one of the lateral sidewalls generally parallel to the tool axis. A second gripping region is on the rear wall portion of the proximal portion of the handle. A third gripping region is on the second front end portion of the housing and offset rearward from first front end portion.

20 Claims, 12 Drawing Sheets

Related U.S. Application Data continuation of application No. 15/975,238, filed on May 9, 2018, now Pat. No. 10,821,594, which is a continuation of application No. 14/595,468, filed on Jan. 13, 2015, now abandoned, which is a continuation-in-part of application No. 29/471,134, filed on Oct. 29, 2013, now Pat. No. Des. 725,981.

(58) Field of Classification Search
USPC .......... 173/169, 170, 171, 213, 217; 16/421; D8/68
See application file for complete search history.

(56) References Cited

U.S. PATENT DOCUMENTS

| | | | | |
|---|---|---|---|---|
| 3,019,673 | A | 2/1962 | Stig et al. | |
| 3,114,423 | A | 12/1963 | Lennart | |
| 3,203,490 | A | 8/1965 | McCarty et al. | |
| 3,456,740 | A | 7/1969 | Paule et al. | |
| 3,517,755 | A | 6/1970 | Badcock | |
| 3,521,895 | A | 7/1970 | Smith | |
| 3,712,352 | A | 1/1973 | Lafferty | |
| 3,809,349 | A | 5/1974 | Baedke | |
| 3,851,562 | A | 12/1974 | Tomita et al. | |
| 3,963,156 | A | 6/1976 | Perrin | |
| 4,330,093 | A * | 5/1982 | Chapman, Jr. | B25F 5/02 242/439.3 |
| 4,436,125 | A | 3/1984 | Blenkush | |
| 4,628,586 | A | 12/1986 | Yoshimi et al. | |
| 4,739,838 | A * | 4/1988 | Marks | B25B 13/461 74/89.45 |
| 4,752,088 | A | 6/1988 | Stahl et al. | |
| 4,974,764 | A | 12/1990 | Cantwell | |
| 5,052,497 | A | 10/1991 | Houben et al. | |
| 5,090,747 | A | 2/1992 | Kotake | |
| 5,113,951 | A | 5/1992 | Houben et al. | |
| D330,318 | S | 10/1992 | Snider | |
| D337,038 | S | 7/1993 | Sakamoto et al. | |
| D345,090 | S | 3/1994 | Okumura | |
| 5,342,155 | A | 8/1994 | Harroun | |
| 5,353,474 | A * | 10/1994 | Good | B25G 1/102 173/171 |
| 5,372,206 | A | 12/1994 | Sasaki et al. | |
| 5,398,946 | A | 3/1995 | Quiring | |
| 5,447,343 | A | 9/1995 | Gajewski et al. | |
| 5,452,830 | A | 9/1995 | Hopkins et al. | |
| 5,464,229 | A | 11/1995 | Salpaka | |
| 5,482,413 | A | 1/1996 | Argaud | |
| 5,515,754 | A | 5/1996 | Elkins | |
| 5,639,194 | A | 6/1997 | Harroun | |
| D399,055 | S | 10/1998 | Coady | |
| D402,872 | S | 12/1998 | Clowers et al. | |
| D406,740 | S | 3/1999 | Zurwelle | |
| 5,951,026 | A | 9/1999 | Harman, Jr. et al. | |
| 5,988,653 | A | 11/1999 | Kuo | |
| 6,047,971 | A | 4/2000 | Harman, Jr. et al. | |
| 6,053,675 | A | 4/2000 | Holland et al. | |
| 6,079,716 | A | 6/2000 | Harman, Jr. et al. | |
| 6,127,751 | A | 10/2000 | Kristen et al. | |
| 6,142,537 | A | 11/2000 | Shimada et al. | |
| 6,199,383 | B1 | 3/2001 | Pusateri | |
| 6,270,085 | B1 | 8/2001 | Chen et al. | |
| 6,293,559 | B1 | 9/2001 | Harman, Jr. et al. | |
| 6,325,157 | B1 | 12/2001 | Arakawa et al. | |
| 6,354,177 | B2 | 3/2002 | Peters | |
| 6,354,635 | B1 | 3/2002 | Dyson et al. | |
| D457,046 | S | 5/2002 | Boyle et al. | |
| D457,797 | S | 5/2002 | Huang | |
| 6,455,186 | B1 | 9/2002 | Moores, Jr. et al. | |
| D467,481 | S | 12/2002 | Watson | |
| D470,028 | S | 2/2003 | Cooper | |
| 6,543,549 | B1 | 4/2003 | Riedl et al. | |
| 6,551,037 | B2 | 4/2003 | Gifford et al. | |
| D478,263 | S | 8/2003 | Welsh | |
| 6,641,011 | B1 | 11/2003 | Kahn | |
| 6,645,666 | B1 | 11/2003 | Moores, Jr. et al. | |
| 6,648,192 | B1 | 11/2003 | Chong | |
| 6,679,406 | B2 | 1/2004 | Sakai et al. | |
| 6,688,611 | B2 | 2/2004 | Gifford et al. | |
| D488,978 | S * | 4/2004 | Cheung | D8/68 |
| 6,776,245 | B2 | 8/2004 | Kristen et al. | |
| D497,300 | S | 10/2004 | Chen | |
| 6,866,105 | B2 | 3/2005 | Pfisterer et al. | |
| 6,905,052 | B2 | 6/2005 | Sakai et al. | |
| 6,929,266 | B2 | 8/2005 | Peters et al. | |
| 6,949,309 | B2 | 9/2005 | Moores, Jr. et al. | |
| 6,962,523 | B2 | 11/2005 | Fraser et al. | |
| D517,323 | S | 3/2006 | Raimondo et al. | |
| 7,012,706 | B1 | 3/2006 | Hansen | |
| 7,014,945 | B2 | 3/2006 | Moores, Jr. et al. | |
| D519,808 | S | 5/2006 | Otsuka et al. | |
| 7,066,678 | B2 | 6/2006 | Huang | |
| 7,140,451 | B2 | 11/2006 | Yoshimizu et al. | |
| D534,405 | S | 1/2007 | Concari | |
| 7,157,882 | B2 | 1/2007 | Johnson et al. | |
| 7,157,883 | B2 | 1/2007 | Johnson et al. | |
| 7,164,257 | B2 | 1/2007 | Johnson et al. | |
| 7,237,457 | B2 | 7/2007 | Hsu | |
| D550,052 | S | 9/2007 | Lee | |
| 7,306,052 | B2 | 12/2007 | Vahabi-Nejad et al. | |
| 7,308,950 | B2 | 12/2007 | Faatz et al. | |
| D560,109 | S | 1/2008 | Huang | |
| 7,331,408 | B2 | 2/2008 | Arich et al. | |
| 7,342,381 | B2 | 3/2008 | Johnson et al. | |
| 7,344,054 | B2 | 3/2008 | Sakai et al. | |
| 7,490,746 | B2 | 2/2009 | Sakai et al. | |
| 7,492,124 | B2 | 2/2009 | Johnson et al. | |
| 7,498,526 | B2 | 3/2009 | Lohr et al. | |
| 7,500,811 | B2 | 3/2009 | Pfob | |
| 7,504,804 | B2 | 3/2009 | Johnson et al. | |
| 7,565,854 | B2 | 7/2009 | Chiang et al. | |
| 7,594,354 | B1 | 9/2009 | Chadwick | |
| D605,488 | S | 12/2009 | Aglassinger | |
| D605,489 | S | 12/2009 | Aglassinger | |
| D605,921 | S | 12/2009 | Cowan | |
| D609,073 | S | 2/2010 | Lin | |
| 7,667,437 | B2 | 2/2010 | Johnson et al. | |
| 7,677,752 | B2 | 3/2010 | Tadokoro et al. | |
| 7,705,497 | B2 | 4/2010 | Arich et al. | |
| D617,168 | S * | 6/2010 | Yamamoto | D8/68 |
| 7,736,792 | B2 | 6/2010 | Moores, Jr. et al. | |
| 7,757,704 | B2 | 7/2010 | Lien | |
| 7,758,274 | B2 | 7/2010 | Paul | |
| 7,791,318 | B2 | 9/2010 | Johnson et al. | |
| 7,793,572 | B2 | 9/2010 | Hirt et al. | |
| 7,796,627 | B2 | 9/2010 | Hurley et al. | |
| 7,802,706 | B1 | 9/2010 | Selsor | |
| 7,810,414 | B2 | 10/2010 | Hsu | |
| 7,823,483 | B2 | 11/2010 | Yamada | |
| 7,874,232 | B2 | 1/2011 | Gauthreaux et al. | |
| 7,944,181 | B2 | 5/2011 | Johnson et al. | |
| 7,952,326 | B2 | 5/2011 | Johnson et al. | |
| 7,988,538 | B2 | 8/2011 | Trautner et al. | |
| D647,774 | S | 11/2011 | Okuda et al. | |
| D647,775 | S | 11/2011 | Toszegi | |
| 8,067,860 | B2 | 11/2011 | Hoffmann et al. | |
| 8,100,200 | B2 | 1/2012 | Wolfer | |
| 8,113,297 | B2 | 2/2012 | Sakakibara et al. | |
| 8,113,922 | B2 | 2/2012 | Esenwein | |
| 8,220,367 | B2 | 7/2012 | Hsu | |
| 8,261,853 | B2 | 9/2012 | Hachisuka | |
| D670,989 | S | 11/2012 | Kawase et al. | |
| D672,627 | S | 12/2012 | Kawase et al. | |
| 8,328,475 | B2 | 12/2012 | Naughton et al. | |
| 8,333,252 | B2 | 12/2012 | Britz et al. | |
| 8,348,727 | B2 | 1/2013 | Trautner et al. | |
| 8,354,183 | B2 | 1/2013 | Konuma et al. | |
| 8,360,439 | B2 | 1/2013 | Hirt et al. | |
| D675,500 | S | 2/2013 | Taniguchi et al. | |
| D677,137 | S | 3/2013 | Kawase et al. | |
| D678,744 | S | 3/2013 | Aoki et al. | |
| D679,160 | S | 4/2013 | Okuda et al. | |
| D679,161 | S | 4/2013 | Kawase et al. | |
| 8,418,778 | B2 | 4/2013 | Eshleman et al. | |

(56) References Cited

U.S. PATENT DOCUMENTS

| | | | | |
|---|---|---|---|---|
| 8,430,182 | B2 | 4/2013 | Soika et al. | |
| 8,443,913 | B2 | 5/2013 | Nagasaka et al. | |
| D684,612 | S | 6/2013 | Frazier | |
| 8,499,850 | B2 | 8/2013 | Hofbrucker et al. | |
| 8,500,173 | B2 | 8/2013 | Zahler et al. | |
| 8,714,282 | B2 | 5/2014 | Chen et al. | |
| D710,174 | S | 8/2014 | Moss | |
| D710,175 | S | 8/2014 | Moss et al. | |
| D710,176 | S | 8/2014 | Santamarina | |
| D713,706 | S | 9/2014 | Jing et al. | |
| D717,351 | S | 11/2014 | Burca | |
| D727,127 | S | 4/2015 | Schmid | |
| 10,821,594 | B2 * | 11/2020 | Elder | B25F 5/02 |
| 11,707,830 | B2 * | 7/2023 | Elder | B25F 5/02 173/170 |
| 2001/0050297 | A1 | 12/2001 | Zahorski | |
| 2002/0122707 | A1 | 9/2002 | Sakai et al. | |
| 2002/0166421 | A1 | 11/2002 | Bowerman | |
| 2003/0066666 | A1 * | 4/2003 | Etter | B25F 5/02 173/170 |
| 2003/0074766 | A1 * | 4/2003 | Tillim | A61B 17/2909 16/430 |
| 2003/0146008 | A1 * | 8/2003 | Andriolo | B25F 5/02 173/217 |
| 2003/0168483 | A1 | 9/2003 | Mabe | |
| 2004/0011544 | A1 | 1/2004 | Cooper et al. | |
| 2004/0074938 | A1 | 4/2004 | Sakai et al. | |
| 2004/0178240 | A1 | 9/2004 | Bauer | |
| 2004/0188119 | A1 | 9/2004 | Chen | |
| 2004/0188199 | A1 | 9/2004 | Beck | |
| 2005/0057042 | A1 | 3/2005 | Wicks | |
| 2005/0092792 | A1 | 5/2005 | Sakai et al. | |
| 2005/0230134 | A1 | 10/2005 | Wu | |
| 2005/0279517 | A1 | 12/2005 | Hoffman et al. | |
| 2006/0011367 | A1 | 1/2006 | Teng et al. | |
| 2006/0011681 | A1 | 1/2006 | Raimondo et al. | |
| 2006/0088393 | A1 | 4/2006 | Cooper | |
| 2006/0137144 | A1 | 6/2006 | Tillim et al. | |
| 2006/0225540 | A1 | 10/2006 | Tsai et al. | |
| 2007/0102462 | A1 | 5/2007 | Sakai et al. | |
| 2008/0187822 | A1 | 8/2008 | Breitenbach | |
| 2010/0096156 | A1 * | 4/2010 | Miyazawa | B25F 5/02 173/170 |
| 2010/0122825 | A1 * | 5/2010 | Hachisuka | B25F 5/02 173/170 |
| 2010/0252293 | A1 * | 10/2010 | Lopano | B25F 5/02 173/170 |
| 2011/0094764 | A1 | 4/2011 | Wei | |
| 2011/0139479 | A1 | 6/2011 | Nagasaka et al. | |
| 2011/0180286 | A1 | 7/2011 | Oomori et al. | |
| 2011/0204621 | A1 | 8/2011 | Whitaker et al. | |
| 2011/0290888 | A1 | 12/2011 | Mayer et al. | |
| 2011/0297409 | A1 | 12/2011 | Chen et al. | |
| 2011/0303718 | A1 | 12/2011 | Spasov et al. | |
| 2012/0043102 | A1 | 2/2012 | Okuda | |
| 2012/0061117 | A1 | 3/2012 | Nagasaka et al. | |
| 2012/0073847 | A1 | 3/2012 | Nagasaka et al. | |
| 2012/0080963 | A1 | 4/2012 | Yoshikawa | |
| 2012/0085560 | A1 | 4/2012 | Kuroyanagi et al. | |
| 2012/0090863 | A1 | 4/2012 | Puzio et al. | |
| 2012/0160530 | A1 | 6/2012 | Ikuta et al. | |
| 2012/0169256 | A1 | 7/2012 | Suda et al. | |
| 2012/0199372 | A1 | 8/2012 | Nishikawa et al. | |
| 2012/0292865 | A1 | 11/2012 | Sugimoto et al. | |
| 2012/0318549 | A1 | 12/2012 | Nagasaka et al. | |
| 2013/0000934 | A1 | 1/2013 | Tadokoro et al. | |
| 2013/0105188 | A1 | 5/2013 | Sakamaki et al. | |

FOREIGN PATENT DOCUMENTS

| | | | |
|---|---|---|---|
| EP | 1690649 | B1 | 1/2009 |
| EP | 2221150 | B1 | 6/2011 |
| EP | 2489473 | A2 | 8/2012 |
| EP | 2402123 | B1 | 5/2013 |
| EP | 2186609 | B1 | 10/2015 |
| EP | 2444202 | B1 | 7/2019 |
| EP | 2258518 | B1 | 8/2019 |
| EP | 2363246 | B1 | 9/2021 |
| JP | H0911158 | A | 1/1997 |
| JP | 2004255503 | A | 9/2004 |
| JP | 2006255837 | A | 9/2006 |
| JP | 2007276108 | A | 10/2007 |
| JP | 2007276109 | A | 10/2007 |
| JP | 2008004024 | A | 1/2008 |
| JP | 2008062337 | A | 3/2008 |
| JP | 2009078322 | A | 4/2009 |
| JP | 2009083058 | A | 4/2009 |
| JP | 2010036260 | A | 2/2010 |
| JP | 2010201512 | A | 9/2010 |
| JP | 2011235372 | A | 11/2011 |
| JP | 2012040659 | A | 3/2012 |
| JP | 2012196737 | A | 10/2012 |
| JP | 2013006253 | A | 1/2013 |
| WO | 2011052260 | A1 | 5/2011 |

OTHER PUBLICATIONS

Ian Forte, "Dewalt Studio Fall 2011: Final Model—Dewalt Ergo Tech Cordless Drywall Screwgun," Coroflo., Oct. 16, 2011, Retrieved from the Internet on Oct. 15, 2014 at URL: <http:/www..coroflot.com/ianforte/dewalt-studio-fall-2011>.

amazon.com, Printout of webpage offering sale of Bosch SG182BN Bare Tool 18-Volt Brushless Drywall Screwdriver, Jan. 13, 2015, 3 pages, USA.

Hilti, Printout of webpage offering sale of Hilti SD 4500-A18 Cordless Drywall Screw Driver, Jan. 13, 2015, 2 pages, USA.

makitatools.com, Printout of webpage offering sale of 18V LXT Lithium-Ion Cordless Drywall Screwdriver, Tool Only, Model LXFS01Z, Jan. 13, 2015, 2 pages, USA.

Karl Dewaele, Extended European Search Report, Aug. 31, 2017, The Hague.

Karl Dewaele, Examination Report re: EP patent application No. 16151118.3-1019, Mar. 27, 2018, 7 pages, EPO, Netherlands.

Karl Dewaele, Partial European Search Report re: related EP application No. 16151118, Jul. 25, 2016, 13 pages, The Hague.

* cited by examiner

POWER TOOL WITH ERGONOMIC HANDGRIP

CROSS REFERENCE TO RELATED APPLICATIONS

This application claims priority to and is a continuation of U.S. patent application Ser. No. 17/032,860, filed Sep. 25, 2020, titled "Power Tool with Ergonomic Handgrip," now U.S. Pat. No. 11,707,830, which is a continuation of U.S. patent application Ser. No. 15/975,238, filed May 9, 2018, titled "Power Tool with Ergonomic Handgrip," now U.S. Pat. No. 10,821,594, which is a continuation of U.S. patent application Ser. No. 14/595,468, filed Jan. 13, 2015, titled "Power Tool with Ergonomic Handgrip," now abandoned which is a continuation-in-part of U.S. Design patent application No. 29/471,134, filed Oct. 29, 2013, titled "Screwdriver and Nosepiece," now U.S. Design Pat. No. D725,981 each of which is incorporated herein by reference.

TECHNICAL FIELD

This application relates to a power tool, such as a drywall screwdriver, with an ergonomic handgrip.

BACKGROUND

Various drywall screwdrivers with handgrips are known in the art. For example, Applicant is aware of a Bosch 18-Volt Brushless Drywall Screwdriver (Model No. SG182BN), a Hilti Cordless Drywall Screwdriver (Model No. SD 4500-A18), and a Makita 18V LXT® Lithium-Ion Cordless Drywall Screwdriver (Model No. LXSF01Z). However, the handgrips of these known screwdrivers are lacking in ergonomic design, resulting in user discomfort and fatigue when the tool is used over a period of time.

SUMMARY

In an aspect, a power tool with an ergonomic handgrip includes a housing with a rear end portion, a front end portion, and lateral sidewalls, and defining a tool axis. A motor is disposed in the housing. A working end is coupled to the front end portion of the housing, and configured to be driven by the motor. A handle has a proximal portion coupled to the housing, a distal end portion away from the housing, a rear wall portion, and a front wall portion, and defines a handle axis. A trigger is coupled to the handle and defines a trigger axis extending in a direction of trigger movement. A first gripping region includes a rear concave recess on the rear end portion of the housing and a lateral concave recess extending along one of the lateral sidewalls of the housing generally parallel to the tool axis. The rear concave recess has an innermost point that is closest to the front end portion of the housing. A second gripping region includes a convex surface on the rear wall portion of the proximal portion of the handle. A vertical line extending from the innermost point generally perpendicular to the tool axis intersects the trigger axis at a first intersection point that is forward of a second intersection point where the trigger axis intersects the handle axis.

Implementations of this aspect may include one or more of the following features. A third gripping region may be disposed on the housing, and offset rearward of the front end portion of the housing. The trigger axis may be generally perpendicular to the handle axis. The trigger axis may be at an acute angle of at least 15 degrees to the tool axis. The convex surface may have a curvature defined by an ellipse that has an eccentricity of less than 0.5. The ellipse may have a center proximate to the trigger axis. The ellipse may have a minor axis generally parallel to the tool axis and a major axis generally perpendicular to the tool axis. The convex surface may have a rearmost point that is approximately 26 mm to 32 mm rearward of the innermost point and approximately 70 mm to 80 mm distal of the innermost point. A fourth gripping surface may be on the rear wall portion of the distal portion of the handle extending along the handle to a point distal of the trigger. The ergonomic handgrip may be configured to be grasped in one of: (a) a first grip position where the first gripping region receives a thumb and a forefinger of a user, the second gripping region receives in a palm of the user, and the trigger receives at least one of a ring finger and a pinky finger of the user; and (b) a second grip position where the second gripping portion receives the thumb of the user, the trigger receives at least one of the forefinger and the middle finger of the user, and the fourth gripping region receives the palm of the user.

In another aspect, a power tool with an ergonomic handgrip includes a housing with a rear end portion, a front end portion, and lateral sidewalls, and defines a tool axis. A motor is disposed in the housing. A working end is coupled to the front end portion of the housing, and configured to be driven by the motor. A handle has a proximal portion coupled to the housing, a distal end portion away from the housing, a rear wall portion, and a front wall portion, and defines a handle axis. A trigger is coupled to the handle and defines a trigger axis extending in a direction of trigger movement. A first gripping region includes a rear concave recess on the rear end portion of the housing and a lateral concave recess extending along one of the lateral sidewalls of the housing generally parallel to the tool axis. A second gripping region includes a convex surface on the rear wall portion of the proximal portion of the handle. The convex surface has a curvature defined by an ellipse that with an eccentricity of less than 0.5.

Implementations of this aspect may include one or more of the following features. The trigger axis may be generally perpendicular to the handle axis. The trigger axis may be at an acute angle of at least 15 degrees to the tool axis. The ellipse may have a center proximate to the trigger axis. The ellipse may have a minor axis generally parallel to the tool axis and a major axis generally perpendicular to the tool axis. The rear concave recess may have an innermost point that is closest to the front end portion of the housing, and the convex surface may have a rearmost point that is approximately 26 mm to 32 mm rearward of the innermost point and approximately 70 mm to 80 mm distal of the innermost point. A fourth gripping surface may be on the rear wall portion of the distal portion of the handle extending along the handle to a point distal of the trigger. The ergonomic handgrip may be configured to be grasped in one of: (a) a first grip position where the first gripping region receives a thumb and a forefinger of a user, the second gripping region receives in a palm of the user, and the trigger receives a ring finger of the user; and (b) a second grip position where the second gripping portion receives the thumb of the user, the trigger receives the forefinger of the user, and the fourth gripping region receives the palm of the user.

In another aspect, a power tool with an ergonomic handgrip includes a housing with a rear end portion, a first front end portion, a second front end portion, and lateral sidewalls, and defines a tool axis. A motor is disposed in the housing. A working end is coupled to the front end portion of the housing, and configured to be driven by the motor. A handle includes a proximal portion is coupled to the housing, a distal end portion away from the housing, a rear wall portion, a front wall portion, and a pair of sidewalls, and defines a handle axis. A trigger is coupled to the handle and defines a trigger axis extending in a direction of trigger movement. A first gripping region includes a rear concave recess on the rear end portion of the housing and a lateral concave recess extending along one of the lateral sidewalls of the housing generally parallel to the tool axis. A second gripping region includes a convex surface on the rear wall portion of the proximal portion of the handle. A third gripping region is on the second front end portion of the housing and is offset rearward from first front end portion. A fourth gripping region is on the rear end portion of the distal portion of the handle. A fifth gripping region is on the front wall portion of the distal portion of handle adjacent the trigger. A sixth gripping region is on the front wall portion of the distal portion of the handle, distal of the fifth gripping region. The handle has a first depth from the trigger to the convex gripping surface, a second depth from the fifth gripping region to the fourth gripping region, and a third depth from the sixth gripping region to the fourth gripping region, the first depth being greater than the second depth, and the second depth being greater than the third depth. The handle has a first width between the sidewalls at the trigger, a second width between the sidewalls at the fifth gripping region, and a third width between the sidewalls at the sixth gripping region, the first width being less than the second width, and the second width being approximately equal to the third width.

Implementations of this aspect may include one or more of the following features. The gripping regions may be configured to be grasped in one of: (a) a first grip position where the lateral concave recesses receives a thumb and a forefinger of a user, the rear concave recess receives a web between the thumb and the forefinger of the user, the convex gripping surface is received in a palm of the user, the third gripping region receives a middle finger of the user, and the trigger receives at least one of a ring finger and a pinky finger of the user; and (b) a second grip position where the fourth gripping region receives the palm of the user, the convex gripping surface receives the web and the thumb of the user, the fifth gripping region receives the ring finger of the user, the sixth gripping region receives the pinky finger of the user, and the trigger receives at least one of the forefinger and the middle finger of the user. A trigger lock-on switch may be on the fifth gripping region.

Advantages may include one or more of the following. First, the position of the innermost point of the first gripping region relative to the trigger axis and the handle axis results allows the web between the user's thumb and forefinger to lie closer to the trigger, resulting in a more ergonomic grip and easier actuation of the trigger. Second, the position and low eccentricity of the ellipse defining the second gripping region, and the position of the rearmost point of the second gripping region allow the second gripping region to fill the palm of a user's hand without significant gaps, without creating pressure points in the palm, and without forcing the palm upward or rearward to push the fingers out of alignment with the tool axis and the trigger, resulting in a more ergonomic grip. Third, the angle of the trigger axis relative to the tool axis and the handle axis, and the position of the lock-on switch below the trigger allow for more ergonomic actuation of the trigger and the lock-on switch. Fourth, the depth and width of the handle at the trigger, at the fifth gripping surface, and at sixth gripping surfaces result in a more ergonomic grip when the tool is being gripped in the second position. These and other advantages and features will be apparent from the description, the drawings, and the claims.

DETAILED DESCRIPTION

Figure 1:
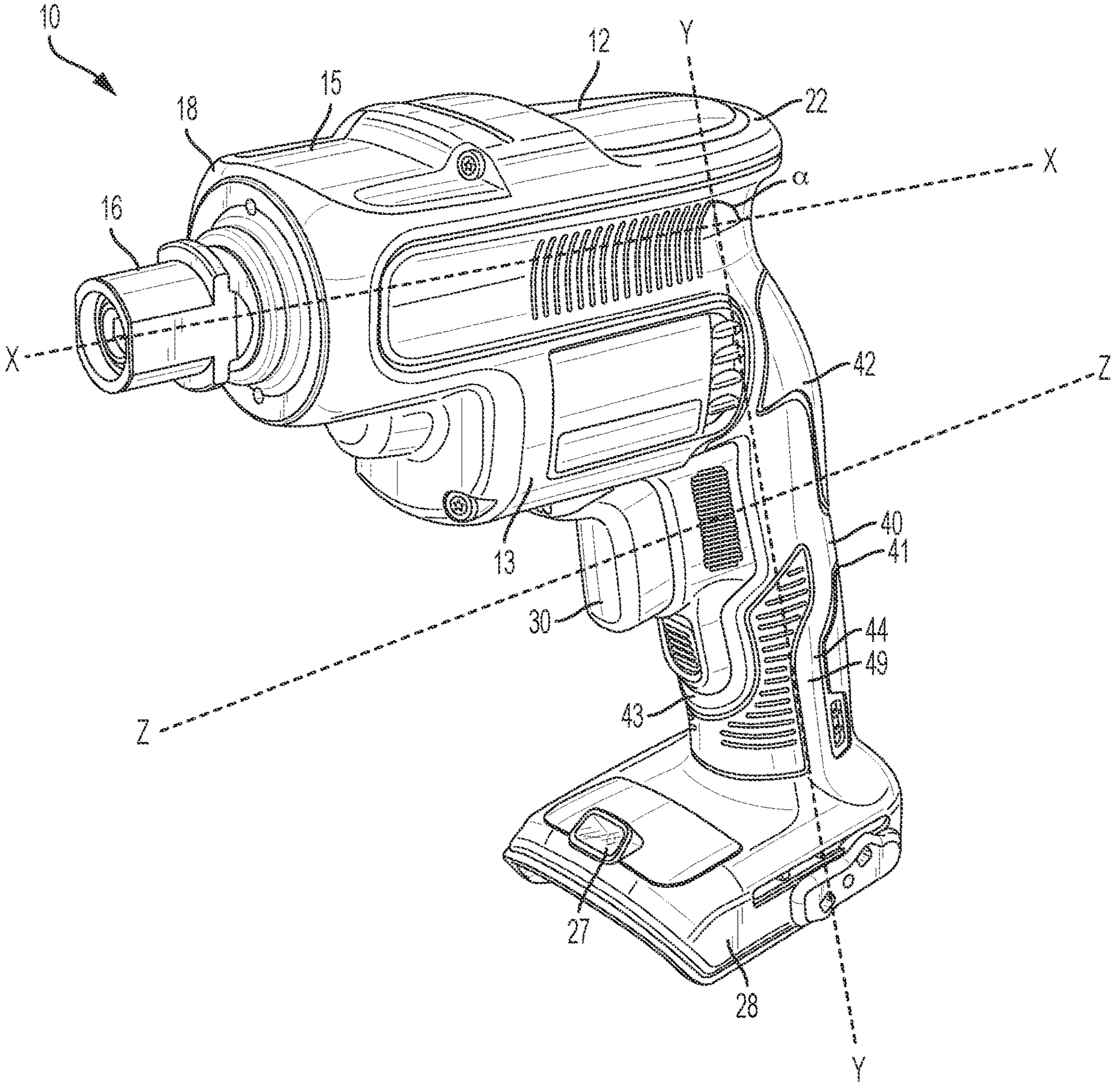
FIG. 1 is a perspective view of an exemplary embodiment of a screwdriver.
Figure 2:
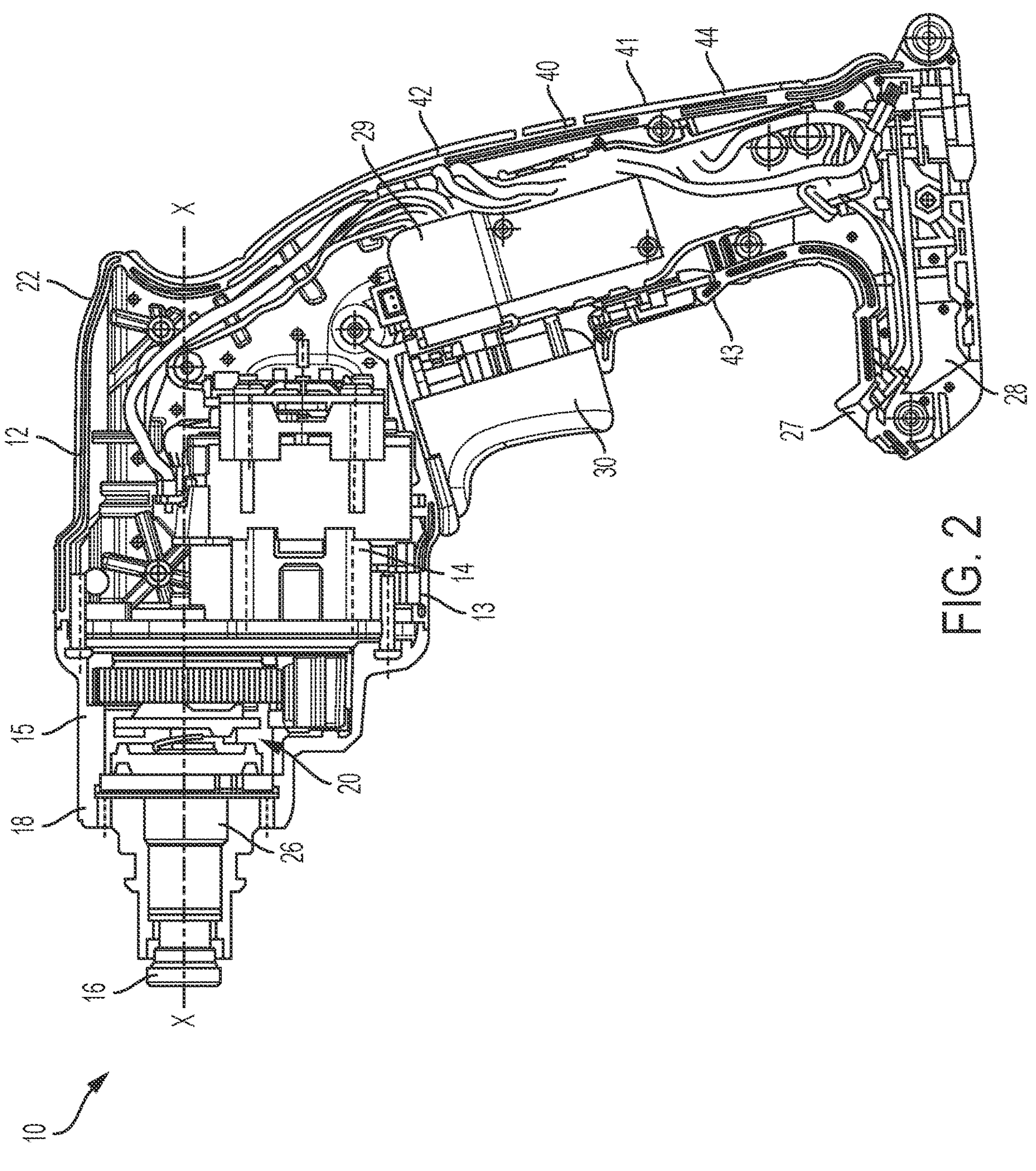
FIG. 2 is a left side view of the screwdriver of FIG. 1 with a portion of the exterior housing removed.

Referring to FIGS. 1 and 2, in one embodiment, a power tool 10 has a housing 12 having a front end portion 18, a rear end portion 22, and sidewalls and defining a tool axis X-X. The housing 12 includes a motor housing portion 13 that contains a rotary motor 14 and a transmission housing portion 15 that contains a parallel axis transmission 20 that transmits rotary motion from the motor 14 to an output spindle 26. Coupled to the front end portion 18 of the transmission housing portion 15 and mechanically connected to the output spindle 26 is a working end or tool holder 16 for retaining a tool bit (e.g., a drill bit or screw driving bit, not shown) and defining a tool holder axis X-X. As shown, the tool holder 16 includes a hex bit retention mechanism. Further details regarding exemplary tool holders are set forth in commonly-owned U.S. patent application Ser. No. 12/394,426 (now U.S. Pat. No. 8,622,401) and Ser. No. 14/186,088 (now U.S. Pat. No. 9,616,557), which are incorporated herein by reference. The working end 16 could encompass other elements, such as a different hex bit holder, a chuck, a nosepiece of a nailer or stapler, or a saw blade holder. The motor 14 drives the working end or tool holder 16 via the transmission 20 and the output spindle 26. A nosepiece or magazine may optionally be coupled to the front end portion 18 of the housing 12, as described and shown in the aforementioned U.S. patent application Ser. No. 14/186,088 (now U.S. Pat. No. 9,616,557), which is incorporated by reference.

Extending downward and slightly rearward of the housing 12 is a handle 40 in a pistol grip formation. The handle 40 has a proximal portion 42 coupled to the housing 12 and a distal portion 44 coupled to a battery receptacle 28. The handle 40 also has a first front wall portion 43 and a second front wall portion 59 facing the tool holder 16 side of the tool, a rear wall portion 41 facing away from the tool holder 16 side of the tool, and sidewalls 49. The handle 40 extends generally along a handle axis Y-Y that is at an obtuse angle α to the tool bit holder axis X-X and that lies along a midline of the handle 40. For example, the angle α may be approximately 100-115 degrees, e.g., approximately 106 degrees, such that the distal portion 44 is located generally rearward and downward of the rear end portion 22 of the housing 12. It should be understood that this angle can be varied among a wide range of angles.

The motor 14 may be powered by an electrical power source, e.g., a battery (not shown), which is coupled to the battery receptacle 28. A trigger 30 is coupled to the handle 40 adjacent the motor housing portion 13 of the housing 12. The trigger 30 electrically connects the battery (or other source of power) to the motor 14 via an electronic switch and control module 29 for controlling power delivery to the motor 14. The trigger 30 defines a trigger axis Z-Z extending along the direction of trigger travel, which is generally perpendicular to the handle axis Y-Y. A light unit (e.g., an LED) 27 may be disposed on the battery receptacle 28 and may be angled to illuminate an area in front of the tool holder 16. Power delivery to the light unit 27 may be controlled by the trigger 30 and the electronic switch and control module 29, or by a separate switch on the tool. As shown in the drawings, the power tool is a battery powered cordless screwdriver. However, it should be understood that the tool may be any type of corded, cordless, pneumatic, or combustion powered tool, such as a drill, an impact driver, a wrench, a hammer, a hammer drill, a nailer, a stapler, a saw, a grinder, a sander, or a router.

Figure 3A:
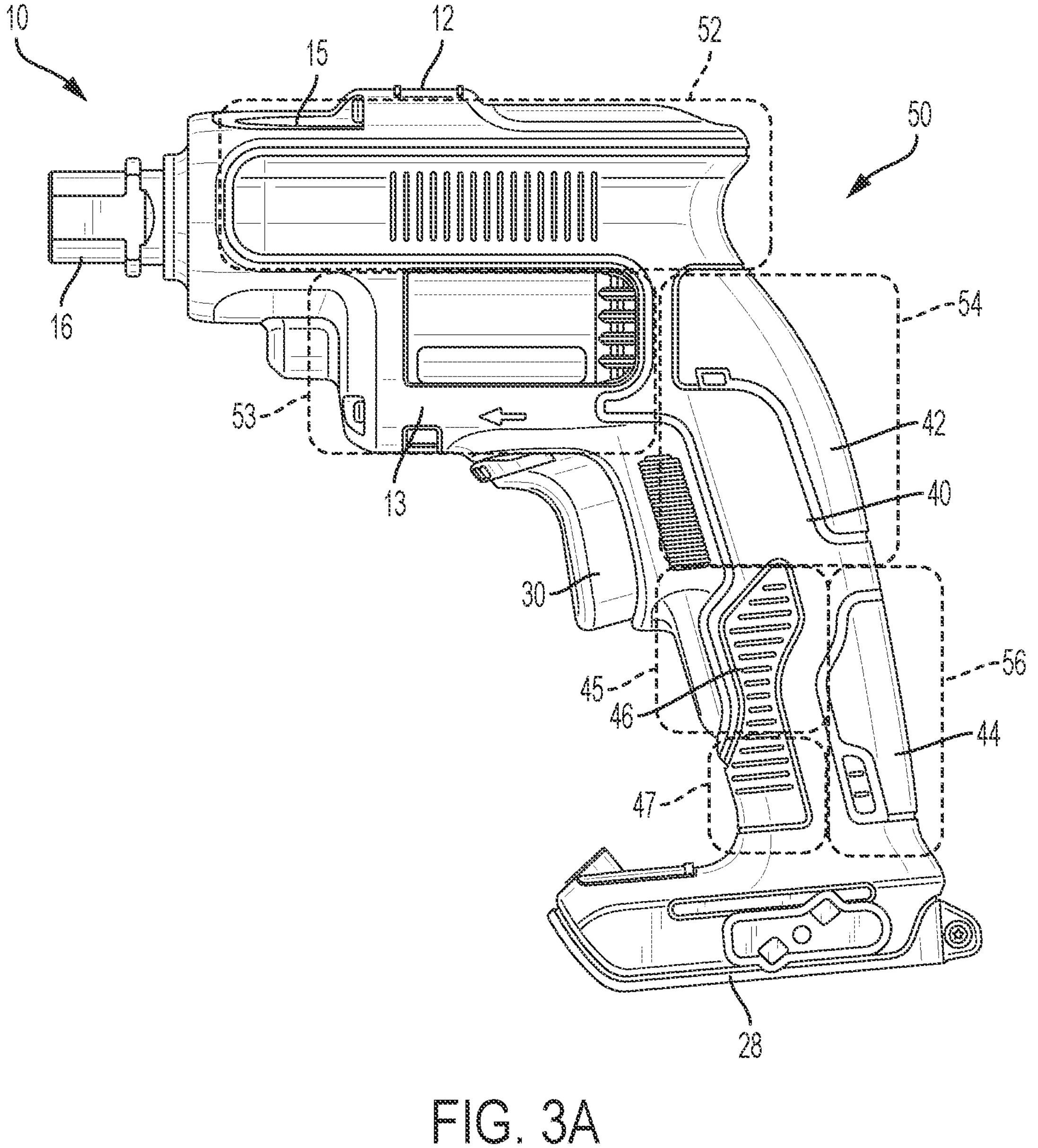
FIGS. 3A and 3B are left side views of the screwdriver of FIG. 1.

Referring to FIG. 3A, the power tool 10 includes an ergonomic handgrip 50 designed to be contoured to a user's hand. The ergonomic handgrip 50 includes a first gripping region 52 on the transmission housing portion 15, a second gripping region 54 on the rear wall portion 41 of the proximal portion 42 of the handle 40, a third gripping region 53 on the motor housing portion 13, a fourth gripping region 56 on the rear wall portion 41 of the distal portion 44 of the handle 40, a fifth gripping region 45 on a front wall portion 43 of the proximal portion 46 of the handle 40 adjacent to the trigger 30, and a sixth gripping region 47 on the front wall portion 43 of the proximal portion 46 of the handle 40 distal of the fifth gripping region 45 and adjacent the battery receptacle 28. One or more of the gripping regions 52, 53, 54, 56, 45, 47 may be formed or covered with an elastomeric material, such as rubber or a resilient plastic material, and may include one or more ridges or recesses to facilitate gripping of these regions.

Figure 3B:
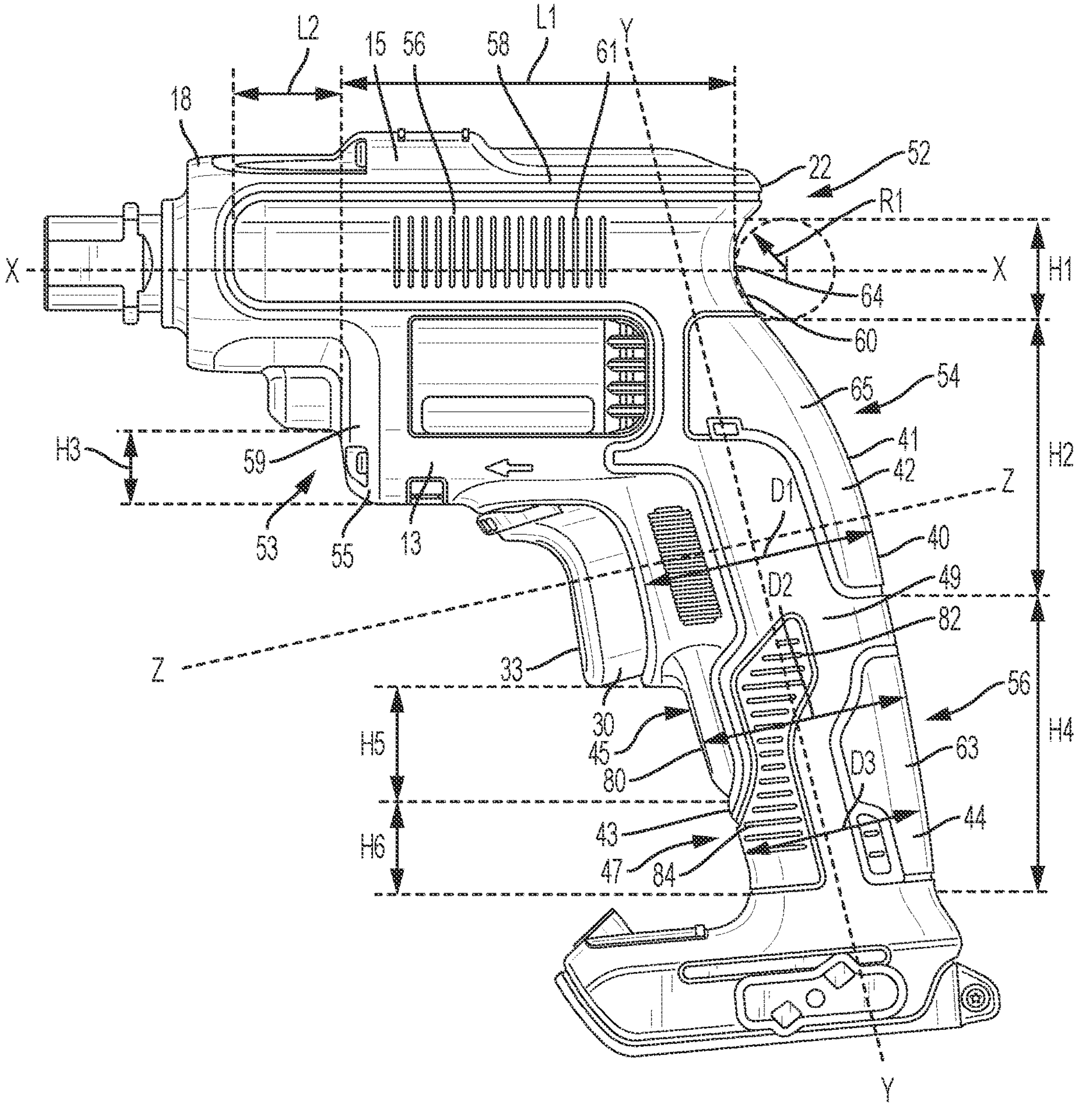
Figure 4:
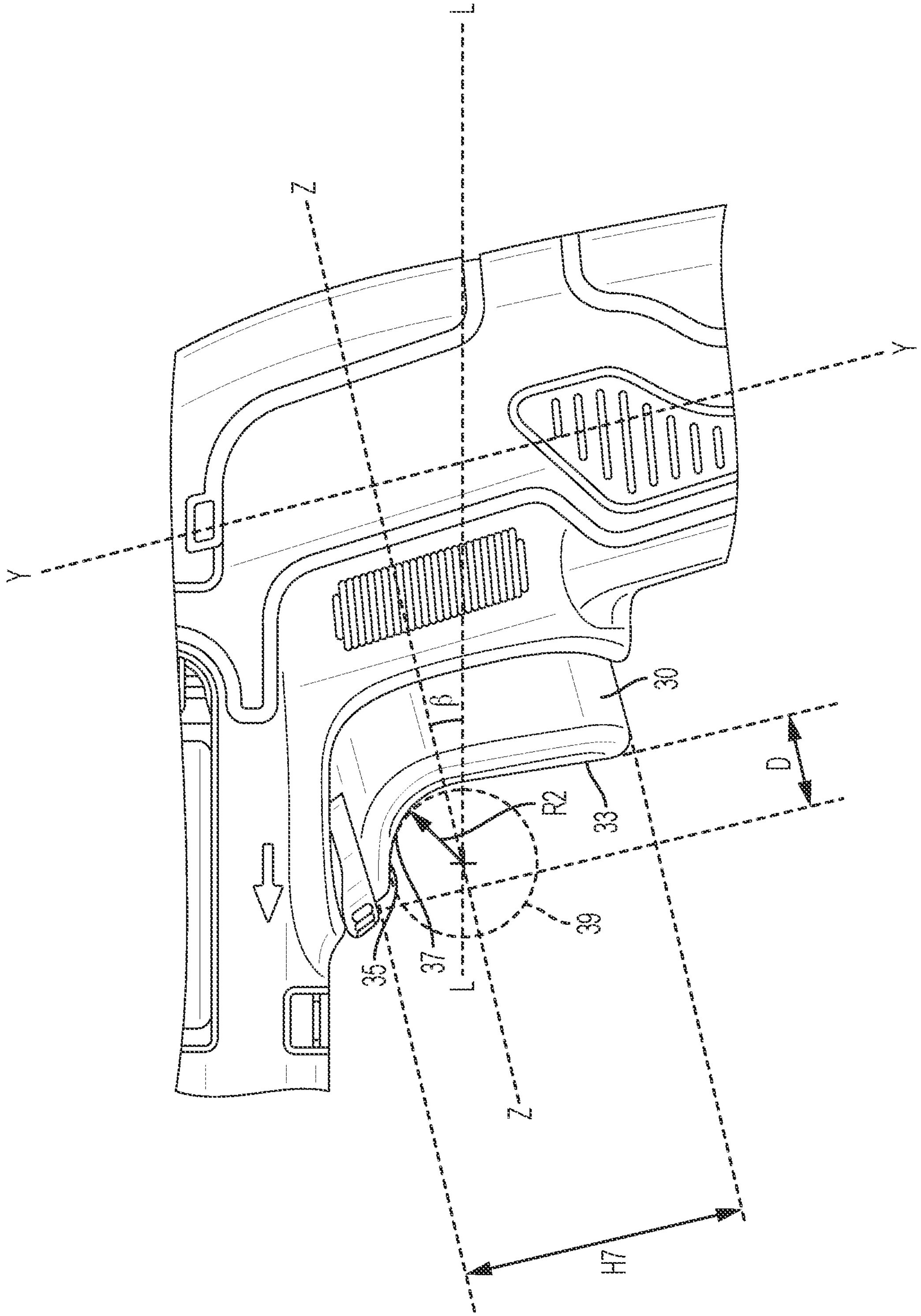
FIG. 4 is a close-up view of the trigger on the screwdriver of FIG. 1.
Figures 5, 6:
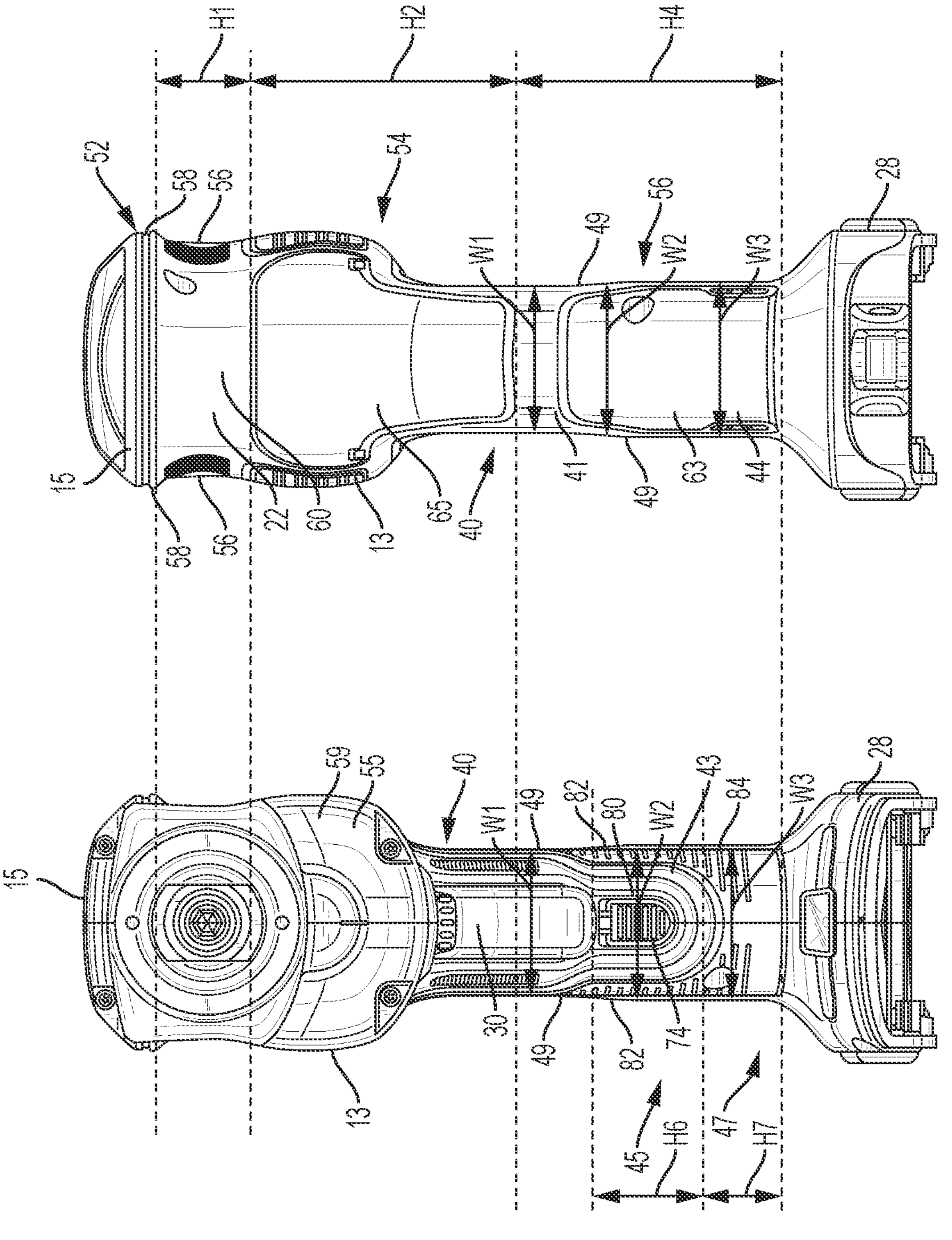
FIG. 5 is a front view of the screwdriver of FIG. 1.
FIG. 6 is a rear view of the screwdriver of FIG. 1.

Referring also to FIGS. 3B-6 and 12, the first gripping region 52 has a pair of longitudinal concave recesses 56 extending generally along or parallel to the tool axis X-X on opposite sidewalls 58 of the transmission housing portion 15. The longitudinal concave recesses 56 extend along most of the length of the transmission housing portion 15, and include ridges 61 to enhance gripping of the recesses 56. The first gripping region 52 also has a rear concave recess 60 in communication with the longitudinal concave recesses 56 and wrapping around the rear end portion 22 of the housing 12. The rear concave recess 60 has a concave curvature having a radius of curvature R1 of approximately 10 mm to 15 mm (e.g., approximately 13.5 mm). When viewed from the side as shown in FIG. 3B, the rear concave recess 60 has an innermost point 64 that is closest to the first front end portion 18 of the housing 12. The innermost point 64 generally coincides with or is proximate to the tool axis X-X. The first gripping region 52 has a first height H1 of approximately 25 mm to 35 mm (e.g., approximately 27 mm).

Figure 12:
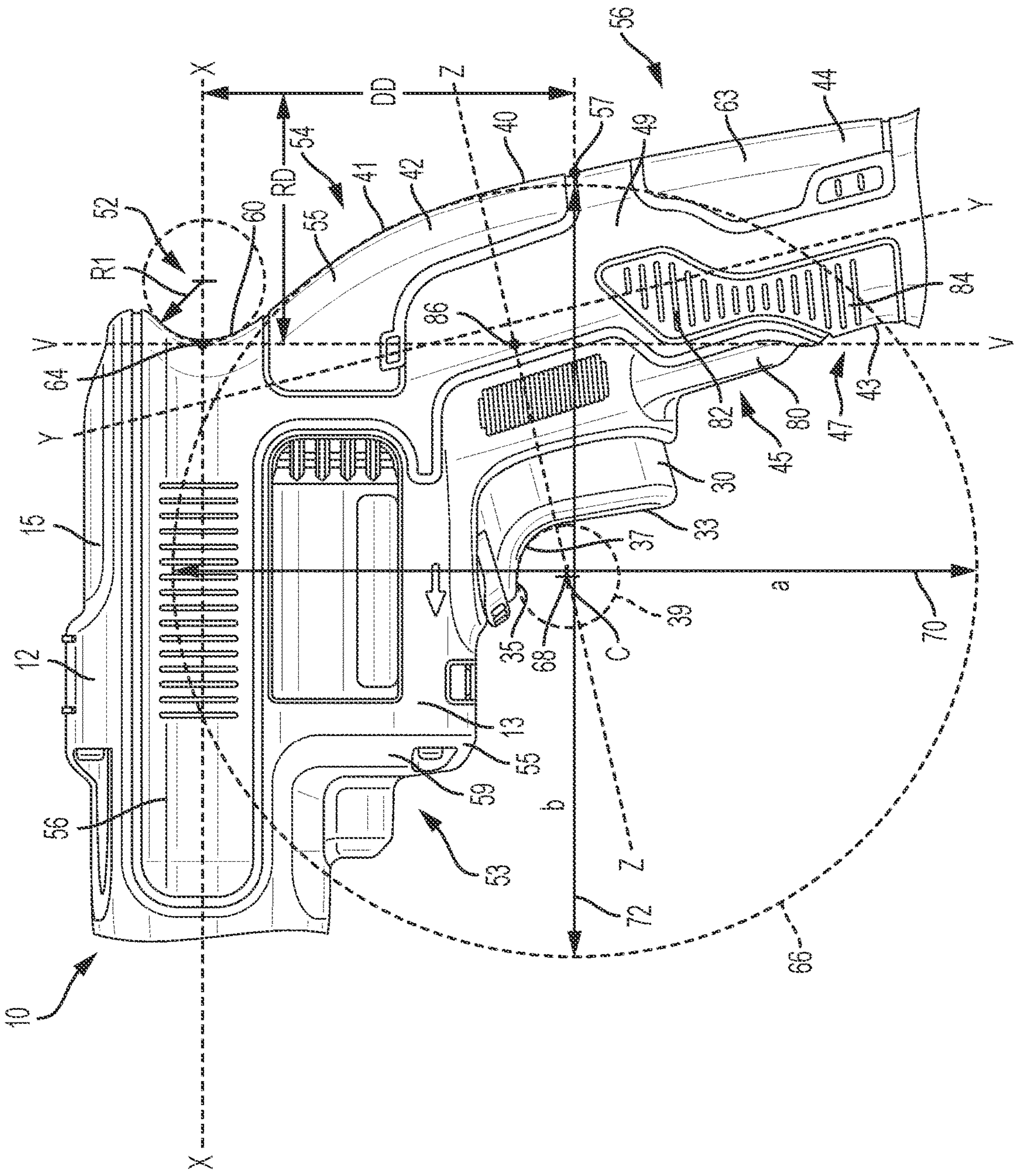
FIG. 12 is a close up left-side view of the screwdriver of FIG. 1.

The second gripping region 54 includes a generally convex gripping surface 65 that wraps around the rear wall portion 41 of the proximal portion 42 of the handle 40 and covers at least a portion of the sidewalls 49 of the handle 40. As shown in FIG. 12, the convex gripping surface 65 has a curvature that is generally defined by an ellipse 66 centered at a center point 68 that is proximate the trigger axis Z-Z and that is positioned below and in front of the trigger 30. The ellipse 66 has a minor or horizontal axis 72 that is generally parallel to the tool axis X-X and a major or vertical axis 70 that is generally transverse to the tool axis X-X. The major axis 70 has a length "a" of approximately 142 mm to 152 mm (e.g., approximately 152 mm), and the minor axis 72 has a length "b" of approximately 135 mm to 145 mm e.g., approximately 140 mm). In one embodiment, both the major axis 70 and the minor axis 72 intersect at least a portion of the trigger 30. Although the center point 68 is not shown as intersecting the trigger axis Z-Z, it should be understood that they may intersect. It should also be understood that the ellipse 66 may instead be a circle, or may have a major axis in the horizontal direction or in a direction transverse to the vertical and horizontal directions.

The ellipse 66 has a relatively small eccentricity. Eccentricity is a measurement of the amount that an elliptical shape surface deviates from circular, and is given by the following equation:

$$\text{Eccentricity} = \sqrt{1 - \frac{b^2}{a^2}},$$

where a=½ the length of the major axis 70 and b=½ the length of the minor axis 72. Eccentricity is measured on a scale of 0 to 1, with 0 being circular, and values approaching 1 being elongated in one direction and flattened in the other direction, approaching a straight line. In the illustrated embodiment, the ellipse 66 that defines the concave gripping surface has an eccentricity of is less than 0.5, such as, for example, between approximately 0.3 and 0.4. In one possible embodiment, the eccentricity of the ellipse may be approximately 0.38.

The second gripping region 54 has a second height H2 of approximately 50 mm to 65 mm (e.g., approximately 58 mm). The second gripping region 54 also has a rearmost point 57 at a point farthest rearward and distal from the innermost point 64. The rearmost point 57 is positioned a distal distance DD of approximately 70 mm to 80 mm (e.g., approximately 71 mm) distally of the innermost point 64, and a rearward distance RD of approximately 26 mm to 32 mm (e.g., approximately 29 mm) rearward of the innermost point 65. The rearmost point 57 is also generally proximate to the rearward end of the minor or horizontal axis 70 of the ellipse 66.

The third gripping region 53 comprises a generally flat gripping surface 59 that is disposed on the second front end portion 55 on the motor housing portion 13 and that partially wraps around the sides of the motor housing portion 13. The third gripping region 53 has a height H3 and is disposed a first offset distance L1 forward of the innermost point 64 of the concave recess 60 and a second offset distance L2 from the front end portion of the longitudinal concave recess 56. The height H3 may be approximately 25 mm to 35 mm (e.g., approximately 30 mm), the first offset distance L1 may be approximately 50 mm to 95 mm (e.g., approximately 84 mm), and the second offset distance L2 may be approximately 13 mm to 64 mm (e.g., approximately 27 mm).

The fourth gripping region 56 has a gripping surface 63 that wraps around the rear wall portion 41 of the distal portion 44 of the handle 40 and covers at least a portion of the sidewalls 49 of the handle 40. When viewed from the side as in FIG. 3B, the gripping surface 63 is substantially straight with a slight convex curvature. The fourth gripping region 56 has a height H4 of approximately 60 mm to 70 mm (e.g., approximately 65 mm).

The fifth gripping region 45 comprises a generally flat front resting surface 80 formed on the front wall portion 45 of the distal portion 44 of the handle 40 adjacent the trigger 30, and side resting surfaces 82 formed on the sidewalls 49 of the distal portion 44 of the handle 40. Disposed on the finger resting surface 80 is a lock-on switch 74 that can be actuated to lock-on the trigger 30 when it is depressed. The fifth gripping region 45 a height H5 of approximately one finger width, e.g., approximately 20 mm to 30 mm (e.g., approximately 25 mm).

The sixth gripping region 47 comprises a generally convex finger resting surface 84 that wraps around the front wall portion 45 of the distal portion 44 of the handle 40 and onto both sidewalls of the handle 40, distal of the fifth gripping region 45 and adjacent the battery receptacle 28. The convex finger resting surface 84 may be joined with the side resting surfaces 82 as one continuous surface. The sixth gripping region 47 has a height H6 of approximately one finger width, e.g., approximately 20 mm to 30 mm (e.g., approximately 25 mm).

The trigger 30 generally has an L-shape with a generally straight front surface 33 and a generally straight top surface 35 joined by a curved corner surface 37. The front surface 33 has a height H7 of approximately two finger widths, for example approximately 33 mm to 43 mm (e.g., approximately 38 mm). The straight top surface 35 has a depth D of approximately 8 mm to 15 mm (e.g., approximately 11 mm). The curved corner surface 37 has a radius of curvature R2 of approximately 7 mm to 13 mm (e.g., approximately 10 mm) defined by a circle 39 with a center point C. The trigger axis Z-Z extends through the center point C in the direction of trigger travel, generally perpendicular to the handle axis Y-Y. The trigger axis Z-Z is at an acute angle $\beta$ of at least 15 degrees, e.g., approximately 15 to 20 degrees (such as 17 degrees) to a line L-L that is parallel to the tool holder axis X-X.

Figure 7:
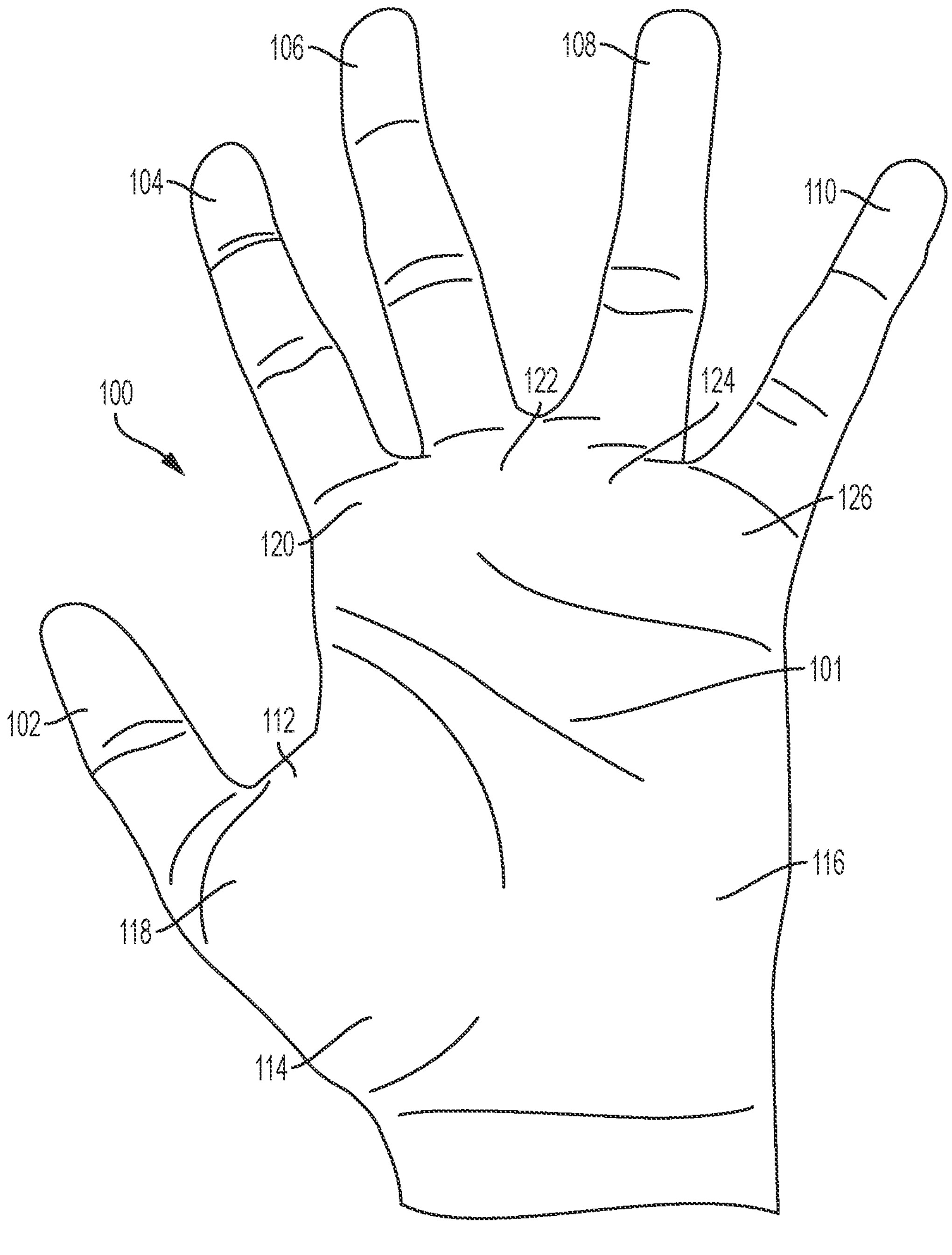
FIG. 7 is a schematic illustration of the anatomy of a user's hand.

The ergonomic grip 50 facilitates ergonomic gripping of the tool by a user's hand in two different grip positions during operation of the tool. FIG. 7 illustrates the anatomical parts of a user's hand. Generally, a user's hand 100 includes a palm 101 to which is connected a thumb 102, a forefinger 104, a middle finger 106, a ring finger 108, and a pinky finger 110. A web 112 of muscles connects the base of the thumb 102 and forefinger 104. In addition, the palm 101 includes a center region 111 flanked by two fleshy pads in the form of a thenar eminence 114 on the thumb side of the palm and the hypothenar eminence 116 on the pinky side of the palm. Further, there are fleshy pads 118, 120, 122, 124, and 126 on the palm 101 at the base of the thumb 118 and each finger 104, 106, 108, and 110.

The handle 40 has a first depth D1 and a first width W1 at the trigger, a second depth D2 and a second width W2 at the fifth gripping region 45, and a third depth D3 and a third width W3 at the sixth gripping region 47. The first, second, and third depths D1, D2, D3 are measured from the trigger to the second gripping region 54, from the fifth gripping region 45 to the fourth gripping region 56, and from the sixth gripping region 47 to the fourth gripping region, respectively. The first depth D1 is greater than the second depth D2, which is greater than the third depth D3. For example, the first depth D1 is approximately 45 mm to 55 mm (e.g., approximately 50 mm), the second depth D2 is approximately 40 mm to 45 mm (e.g., approximately 42 mm), and the third depth D3 is approximately 35 mm to 40 mm (e.g., approximately 37 mm). The first, second and third widths W1, W2, W3 are measured between sidewalls 49 of the handle 40 at the trigger 30, at the fifth gripping region 45 and at the sixth gripping region 47, respectively. The first width W1 is less than the second width W2, which is approximately equal to the third width W3. For example, the first width W1 is approximately 30 mm to 35 mm (e.g., approximately 32 mm), the second width W2 is approximately 31 mm to 36 mm (e.g., approximately 35 mm), and the third width W3 is approximately 28 mm to 37 mm (e.g., approximately 35 mm).

Figure 8:
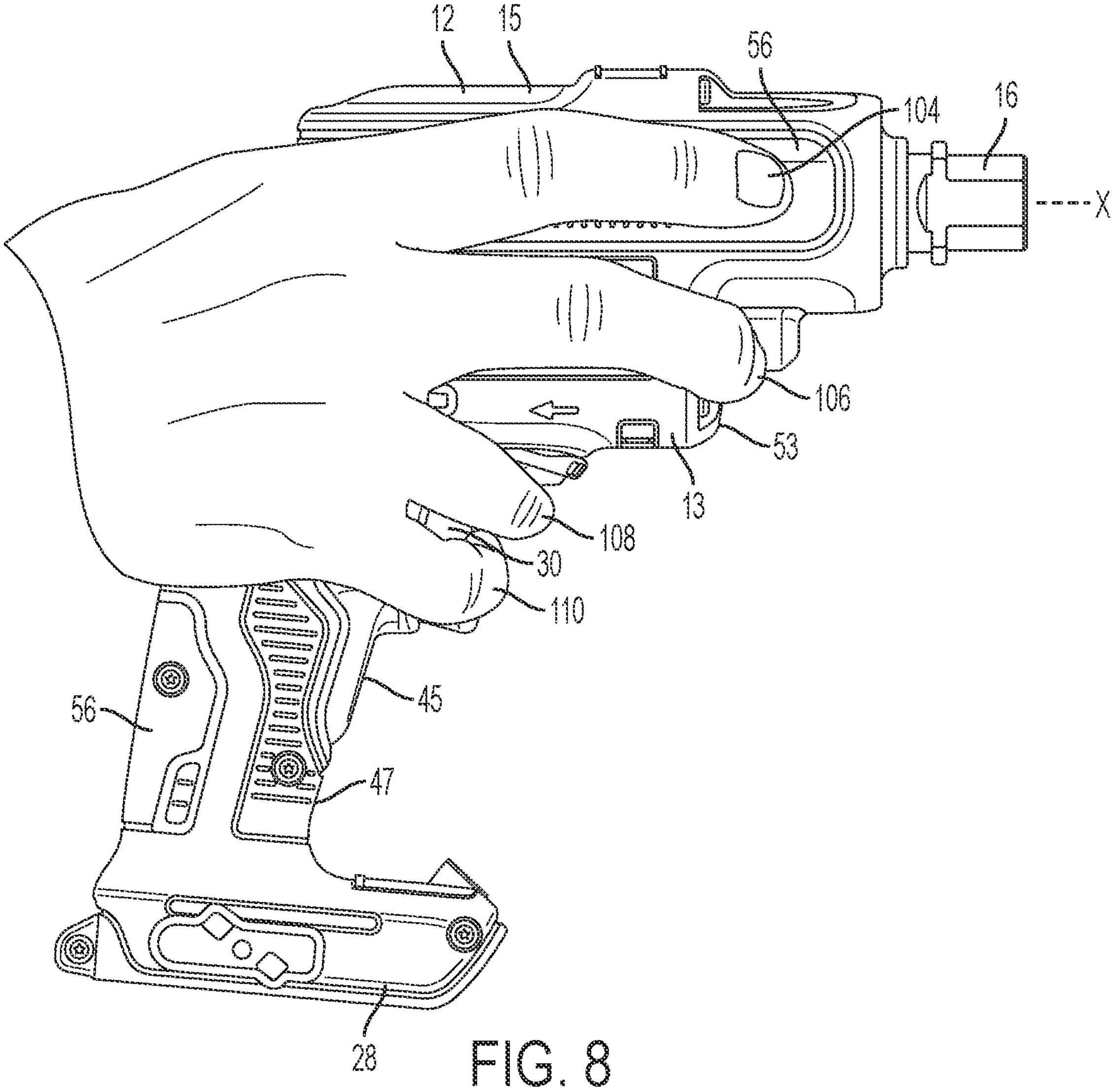
FIG. 8 is a right side view of the screwdriver of FIG. 1 being gripped in a first position.
Figure 9:
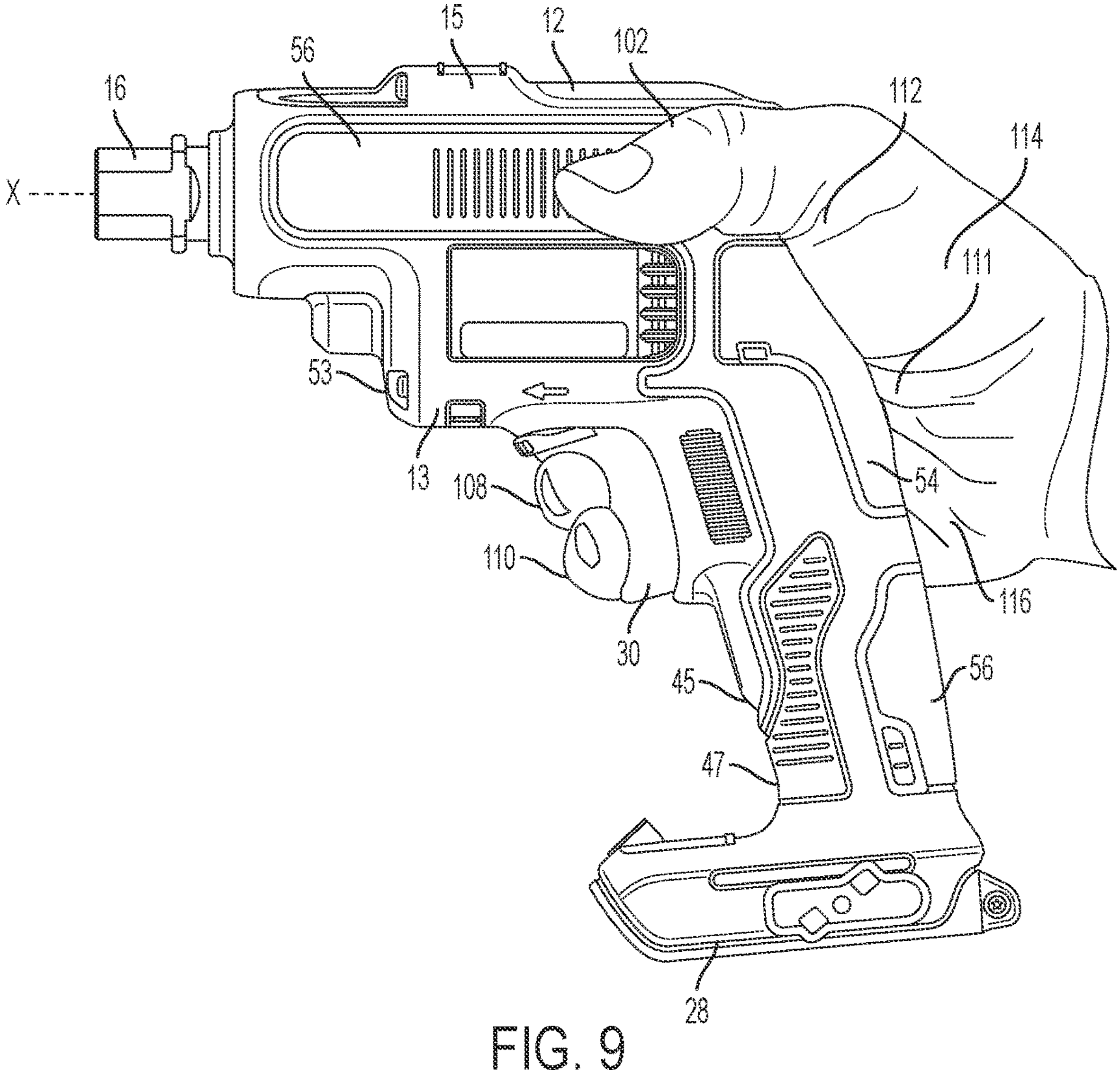
FIG. 9 is a left side view of the screwdriver of FIG. 1 being gripped in the first position.

Referring to FIGS. 8 and 9, when gripped in the first grip position, the longitudinal concave recesses 56 of the concave gripping region 52 receive the thumb 102 and forefinger 104, which are generally aligned along the tool holder axis X-X. The rear concave recess 60 receives the web 112 that connects the thumb 102 and forefinger 104. The second gripping region 54 is received in the center region 111 of the palm 101 with the thenar eminence 114 on one side of the second gripping region 54 and the hypothenar eminence 116 on the other side of the second gripping region 54. The middle finger 106 rests alongside the motor housing portion 13 with the fingertip of the middle finger 106 resting on the third gripping region 53. The ring finger 108 and the pinky finger 110 rest on the trigger 30 and are used to actuate the trigger 30. The pinky finger 110 can also be used to actuate the lock-on switch 74.

Figure 10:
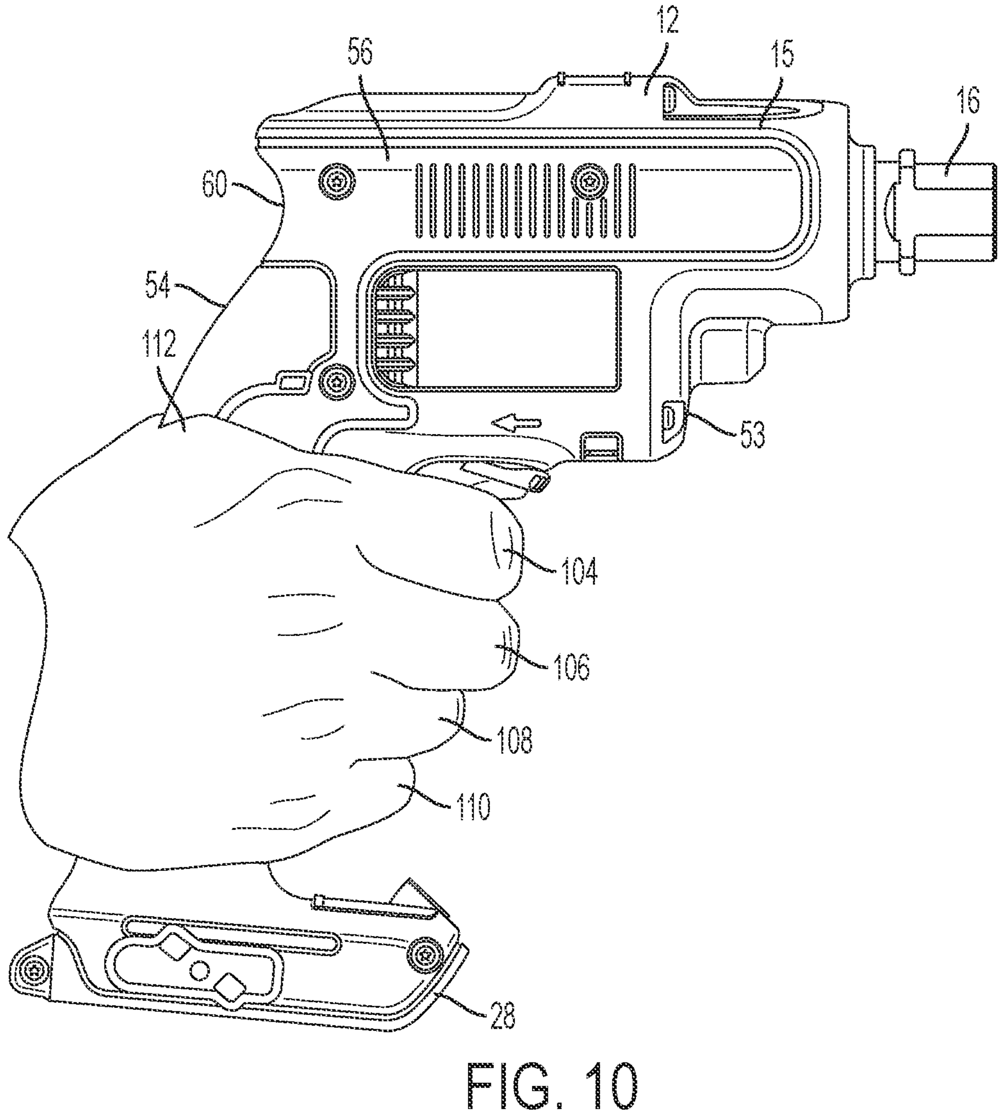
FIG. 10 is a right side view of the screwdriver of FIG. 1 being gripped in a second position.
Figure 11:
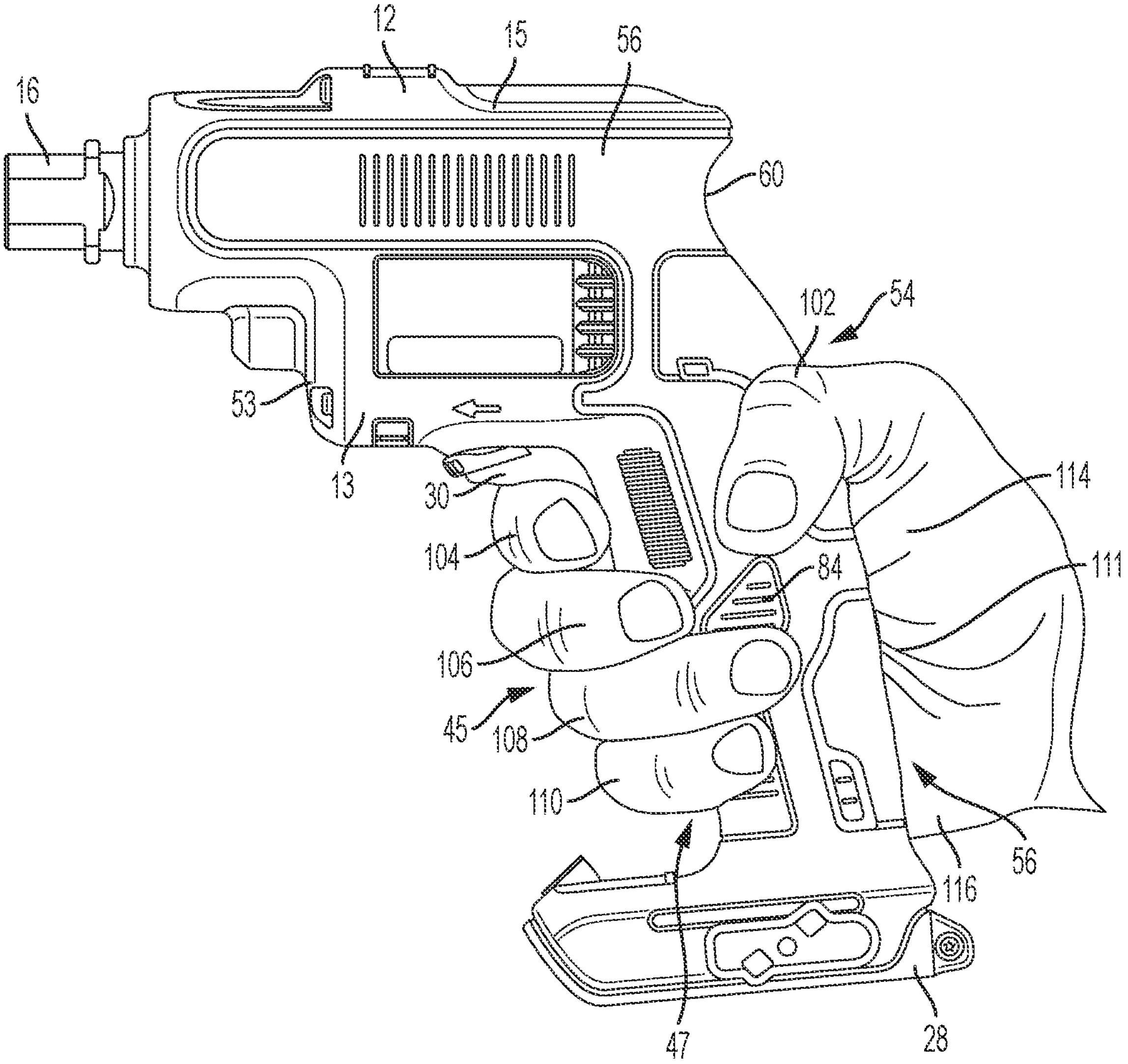
FIG. 11 is a left side view of the screwdriver of FIG. 1 being gripped in the second position.

Referring to FIGS. 10 and 11, when gripped in the second grip position, the fourth gripping region 56 receives the center region 111 of the palm 100 with the thenar eminence 114 on one side of the fourth gripping region 56 and the hypothenar eminence 116 on the other side of the fourth gripping region 56. The forefinger 104 and middle finger 106 are received on the trigger 30. The ring finger 108 is positioned to rest on the front surface resting surface 80 and side resting surface 82 of the fifth gripping region 45. The pinky finger 110 is positioned to rest on the finger resting surface 84 of the sixth gripping region 47. The web 112 and thumb 102 rest on the second gripping surface 54. The trigger is actuated using the forefinger 104 and/or middle finger 106, while the lock-on switch 74 is actuated using the ring finger 108.

One or more of the following features, alone or together, proved the handgrip 50 with superior ergonomics. First, the position of the innermost point 64 of the first gripping region 52 results in a more ergonomic design. A vertical line V-V taken from the innermost point 64 on the rear concave recess 60 intersects the trigger axis Z-Z at an intersection point 86 that is forward of the handle axis Y-Y. This configuration allows the web 112 between the thumb 102 and forefinger 104 to lie in a plane that is closer to the trigger 30 when the handle 40 is gripped in the first position. This allows the user's grip to be centered forward of the handle axis, resulting in a more ergonomic grip and easier actuation of the trigger.

Second, the configuration of second gripping region 54 results in a more ergonomic grip. Advantageously, the ellipse 66 that defines the second gripping region 54 has a relatively low eccentricity of less than 0.5, such as 0.3 to 0.4, resulting in a curvature that is neither too shallow nor too sharp. In addition, the rearmost point 57 of the second gripping region 54 is positioned proximate the rear end point to the horizontal axis 70 of the ellipse 66. The rearmost point 57 is positioned at a distance DD of approximately 70 mm to 80 mm (e.g., approximately 71 mm) distally of the innermost point 65, and a rearward distance RD of approximately 26 mm to 32 mm (e.g., approximately 29 mm) from the innermost point 64 of the first gripping region 52. Further, the center point 68 of the ellipse 66 is positioned just below and in front of the trigger, and within the circle 39 that defines the radius R2 of the curved trigger surface 37. These aspects of the second gripping region 54 allow the second gripping region 54 to fill the palm of a user's hand without significant gaps, without creating pressure points in the palm, and without forcing the palm upward or rearward to push the fingers out of alignment with the tool axis and the trigger.

Third, the configuration of the trigger 30 and lock-on switch 74 results in a more ergonomic grip. The trigger 30 travels along the trigger axis Z-Z, at an acute angle R of at least 15 degrees to the tool holder axis X-X (e.g., approximately 17-20 degrees). The trigger axis Z-Z is also generally perpendicular to the handle axis Y-Y. This orientation of the trigger axis Z-Z results in a more ergonomic and natural movement for the ring finger and pinky finger to pull the trigger when the tool is being gripped in the first position, and for the forefinger and middle finger to pull the trigger when the tool is being gripped in the second position. Further, the lock-on switch 74 is positioned on the fifth gripping region 45, just below the trigger 30. This allows the pinky to actuate the lock-on switch 74 when the tool is gripped in the first position and the ring finger to actuate the lock-on switch 74 when the tool is gripped in the second position.

Finally, the configuration of the fourth, fifth and sixth gripping surfaces result in a more ergonomic grip when the tool is being gripped in the second position. The first depth D1 at the trigger is greater than a second depth D2 at the fifth gripping region 45, which is greater than the third depth D3 at the sixth gripping region 47. At the same time, the first width W1 at the trigger 30 is smaller than the second width W2 at the fifth gripping region 45, which is approximately equal to the third width W3 at the sixth gripping region 47. Having the smallest width W1 and largest depth D1 at the trigger 30 allows the sides of the handle to comfortably receive the thenar eminence 114 and the hypothenar eminence 116 while the forefinger and middle finger grasp the trigger. The larger widths W2 and W3 at the finger rests 43 and 45 allow the handle to be comfortably received in the center of the palm. The larger depth D2 at the finger rest 43 than the depth D3 at the finger rest 45 provides a more comfortable grip for the larger ring ringer and smaller pinky finger.

Numerous modifications may be made to the exemplary implementations described above. For example, the trigger may be moved upward and rearward on the housing so that it is closer to the tool axis and to the handle axis. Also, the housing may have only one portion with the motor being in-line with the transmission or directly driving the working end without a transmission. These and other implementations are within the scope of the following claims.

What is claimed is:

1. A power tool comprising:

a housing defining a tool axis and including a rear end portion, a front end portion, and first lateral sidewalls extending between the rear end portion and the front end portion, a motor disposed at least partially in the housing;

a tool bit holder extending forward of the front end portion along the tool axis and configured to be rotatably driven by the motor;

a rear concave recess defined in the rear end portion of the housing and a lateral concave recess extending along at least one of the first lateral sidewalls of the housing in a direction that is generally parallel to the tool axis;

a handle defining a handle axis and including a proximal portion coupled to the rear end portion of the housing, a distal portion disposed away from the housing, and an intermediate portion between the proximal portion and the distal portion, the handle including second lateral sidewalls extending from the first lateral sidewalls along the handle axis and a rear wall portion extending generally transverse to the second lateral sidewalls along handle; and a trigger coupled the proximal portion of the handle and configured to control power delivery to the motor, wherein the proximal portion of the handle has a first front end that receives the trigger and a first depth measured from the first front end to the rear wall portion of the proximal portion of the handle, wherein the intermediate portion of the handle has a second front end disposed rearward of the first front end and a second depth that is less than the first depth from the second front end to the rear wall portion of the intermediate portion of the handle, and wherein the distal portion of the handle has a third front end disposed rearward of the second front end and a third depth that is less than the second depth from the third front end to the rear wall portion of the intermediate portion of the handle.

2. The power tool of claim 1, further comprising a finger rest surface disposed on the housing below the lateral concave recess and frontward of the trigger.

3. The power tool of claim 1, wherein the ergonomic handgrip is configured to be grasped in a first grip position where the at least one concave recess receives a thumb or a forefinger of a user and the rear concave recess receives a web that connects the thumb and the forefinger, the rear end portion of the handle receives at least a portion of a palm of the user, and the trigger receives at least one of a middle finger, a ring finger and a pinky finger of the user.

4. The power tool of claim 3, wherein the ergonomic handgrip is configured to be grasped in a second grip position where the rear end portion of the handle receives a palm of the user, the trigger receives a first finger of the user, the second front end receives a second finger of the user, and the third front end receives a third finger of the user.

5. The power tool of claim 1, wherein the trigger travels along a trigger axis that is generally perpendicular to the handle axis.

6. The power tool of claim 5, wherein the trigger axis is at an acute angle to the tool axis.

7. The power tool of claim 1, wherein the rear end portion of the proximal portion of the handle comprises a convex surface.

8. The power tool of claim 7, wherein convex surface defines a circular or elliptical shape having a center forward of the trigger and proximate to the trigger axis.

9. The power tool of claim 1, further comprising a switch coupled to the front end of the intermediate portion of the handle and is configured to be actuated to enable the motor to continue running when a user releases pressure on the trigger.

10. The power tool of claim 9, wherein the front end of the intermediate portion of the handle has a flat surface and the switch is disposed on the flat surface.

11. The power tool of claim 1, further comprising a battery receptacle coupled to the distal end portion of the handle, the battery receptacle configured to receive a battery for providing power to the motor.

12. The power tool of claim 11, further comprising a LED coupled to the battery receptacle.

13. The power tool of claim 1, wherein the housing comprises a rear motor housing portion that at least partially receives the motor and a front transmission housing portion coupled to a front end of the motor housing portion and that at least partially receives a transmission configured to transmit torque from the motor to the tool bit holder.

14. The power tool of claim 1, wherein the proximal portion of the handle has a first width measured between the second lateral sidewalls and the intermediate portion of the handle has a second width measured between the second lateral sidewalls that is larger than the first width.

15. The power tool of claim 1, wherein the first front end of the proximal portion of the handle has a first height measured parallel to the handle axis, the second front end of the intermediate portion of the handle has a second height measured parallel to the handle axis, and the third front end of the distal portion of the handle has a third height measured parallel to the handle axis, the first height being larger than the second height and the third height.

16. The power tool of claim 1, wherein the rear concave recess and the lateral concave recess comprise an elastomeric material.

17. The power tool of claim 16, wherein the elastomeric material is textured.

18. The power tool of claim 1, wherein the first depth is between 45 mm and 55 mm.

19. The power tool of claim 18, wherein the third depth is between 35 mm and 40 mm.

20. A power tool comprising:

a housing defining a tool axis and including a rear end portion, a front end portion, and first lateral sidewalls extending between the rear end portion and the front end portion, the housing including a motor housing that includes the rear end portion and a transmission housing coupled to a front of the motor housing and including the front end portion;

a motor disposed at least partially in the motor housing;

a transmission disposed at least partially in the transmission housing;

a tool bit holder extending forward of the front end portion along the tool axis and configured to be rotatably driven by the motor via the transmission;

a rear concave recess defined in the rear end portion of the housing, the rear concave recess comprising an elastomeric material;

a pair of lateral concave recesses extending along the first lateral sidewalls of the housing in a direction that is generally parallel to the tool axis, the lateral concave recesses comprising an elastomeric material;

a handle defining a handle axis and at least partially comprising an elastomeric material, the handle including a proximal portion coupled to the rear end portion of the housing, a distal portion disposed away from the housing, and an intermediate portion between the proximal portion and the distal portion, the handle including second lateral sidewalls extending from the first lateral sidewalls along the handle axis and a rear wall portion extending generally transverse to the second lateral sidewalls along handle;

a switch coupled to the intermediate portion of the handle and configured to be actuated to enable the motor to maintain the trigger in an actuated position when a user releases pressure on the trigger;

a battery receptacle coupled to the distal portion of the handle and configured to receive a battery for providing power to the motor; and a trigger coupled the proximal portion of the handle and configured to control power delivery to the motor, wherein the proximal portion of the handle has a first front end that receives the trigger and a first depth measured from the first front end to the rear wall portion of the proximal portion of the handle, wherein the intermediate portion of the handle has a second front end disposed rearward of the first front end and a second depth that is less than the first depth from the second front end to the rear wall portion of the intermediate portion of the handle, and wherein the distal portion of the handle has a third front end disposed rearward of the second front end and a third depth that is less than the second depth from the third front end to the rear wall portion of the intermediate portion of the handle.

* * * * *